United States Patent [19]

McGregor et al.

[11] Patent Number: 4,476,279

[45] Date of Patent: Oct. 9, 1984

[54] HIGH SOLIDS THEIC POLYESTER ENAMELS

[75] Inventors: Charles W. McGregor; James J. Connell, both of Fort Wayne, Ind.

[73] Assignee: Essex Group, Inc., Fort Wayne, Ind.

[21] Appl. No.: 556,807

[22] Filed: Dec. 1, 1983

[51] Int. Cl.$^3$ .................. B32B 15/00; C08G 73/16
[52] U.S. Cl. ......................... 524/602; 427/120; 428/422.8; 524/539; 528/279; 528/289
[58] Field of Search ............ 524/602, 539; 427/120; 428/422.8; 528/279, 289

[56] References Cited

U.S. PATENT DOCUMENTS

| | | | |
|---|---|---|---|
| 3,249,578 | 5/1966 | Meyer et al. | 524/352 |
| 3,342,780 | 9/1967 | Meyer et al. | 528/279 |
| 4,105,639 | 8/1978 | Laganis et al. | 528/289 |
| 4,116,941 | 9/1978 | Hanson | 528/289 |
| 4,117,032 | 9/1978 | Kwiecinski | 528/279 |
| 4,206,261 | 6/1980 | Laganis et al. | 528/289 |
| 4,267,231 | 5/1981 | Zamek | 528/289 |
| 4,404,331 | 9/1983 | Pauze | 427/120 |

*Primary Examiner*—Ronald W. Griffin
*Attorney, Agent, or Firm*—Harry J. Gwinnell

[57] ABSTRACT

A high solids content, relatively low viscosity, organic solvent solution of polyester magnet wire enamel is described. The enamel is a tris (hydroxy-ethylisocyanurate) polyester having a ratio of hydroxyl to carboxyl groups of 1.65 to 2.0:1 and a hydroxyl number of 216 to 316. Such enamels are produced with solids contents of about 50 to about 70% by weight and viscosity less 1,500 cps at 200° F. The method of making such enamel by reacting a glycol, tris (hydroxy-ethylisocyanurate), and an aromatic diacid or diester in the presence of a titanate catalyst is also described.

15 Claims, 1 Drawing Figure

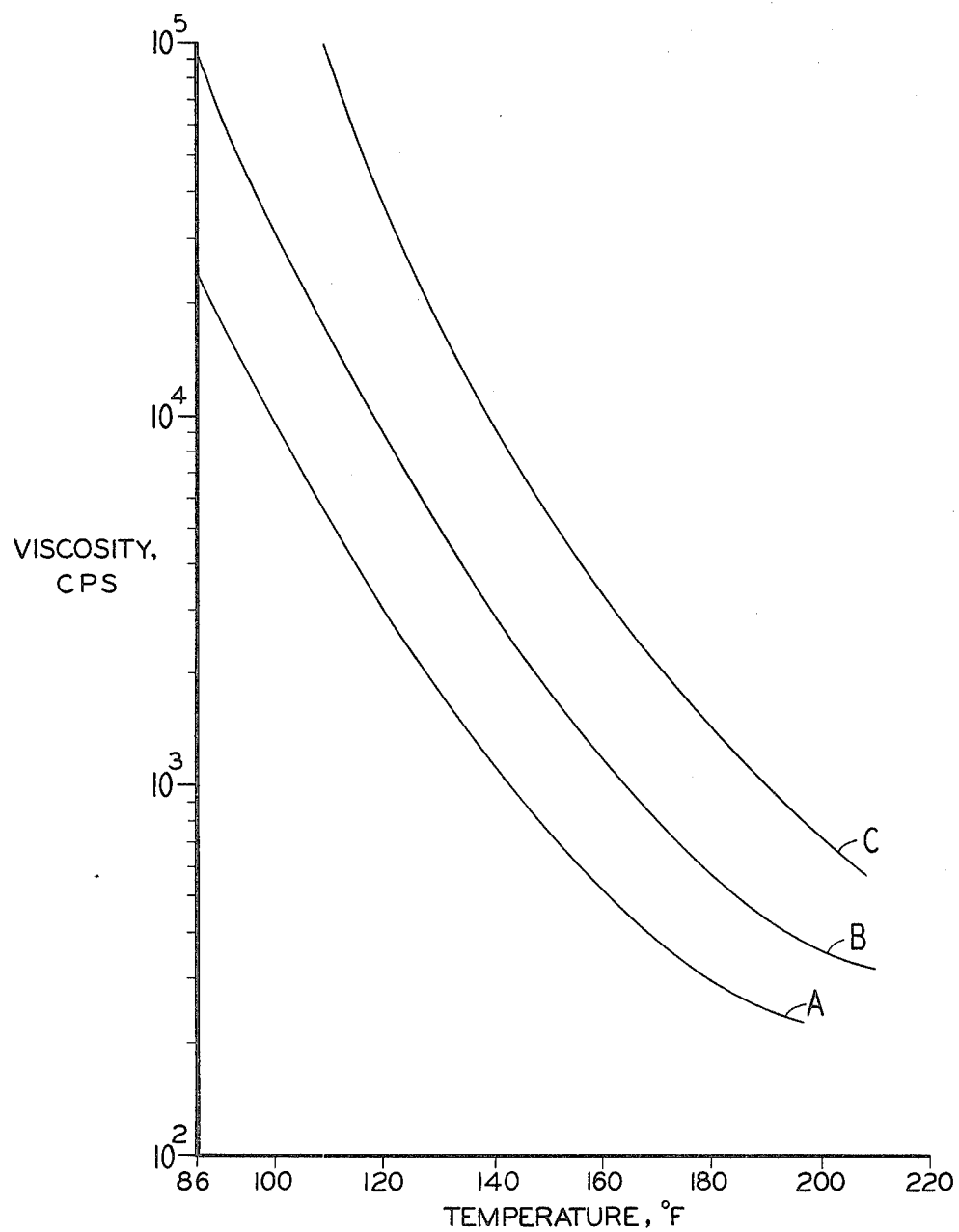

HIGH SOLIDS THEIC POLYESTER ENAMELS

DESCRIPTION

1. Technical Field

The field of art to which this invention pertains is polyester polymers, and specifically tris(hydroxy-ethylisocyanurate)polyester magnet wire enamels.

2. Background Art

Highly cross-linked polyester polymer systems in which tris(hydroxy-ethylisocyanurate) (hereinafter referred to as THEIC) is the tri-functional alcohol have been successfully used as magnet wire coatings for some time. Note U.S. Pat. Nos. 3,342,780 and 3,249,578. Coating enamels made from these polymers are typically low in solids content (for example about 25% to about 40% by weight) and high in organic solvent content (for example 60% to 75% by weight). The application of these enamels requires considerable energy expenditure to remove the large amounts of the typically high boiling organic solvents used to apply these enamels to magnet wire. In addition, the solvents themselves are expensive and cannot be economically reclaimed in the enameling process.

Polymers such as those described in the above patents do not lend themselves to formulation into higher solids content enamels for a variety of reasons. For example, these polymers typically have a hydroxyl group to carboxyl group ratio of 1 to 1.6:1 and a final polymer hydroxyl number of less than 160. This results in a polymer molecular weight distribution of limited solubility and manageability (e.g. viscosity) relegating these polymers to a relatively low solids content enamel to be useful. Attempts to formulate higher solids content enamels with such polymers can result in gelation when the necessary enamel catalysts (titanates) are added. Furthermore, to obtain the necessary smooth coating on the wire during the enameling process high solvent content is required to obtain the necessary enamel flow-out characteristic.

Accordingly, what is needed in this art is a THEIC polyester polymer system that can be made into a relatively high solids content enamel with relatively low organic solvent content and can be applied in the enameling process to a smooth coating that has all of the desirable magnet wire insulating properties.

DISCLOSURE OF INVENTION

The present invention is directed to a high solids content, low viscosity organic solvent solution of a polyester magnet wire enamel. The polyester is a THEIC polyester having a ratio of hydroxyl groups to carboxyl groups of 1.65 to 2.0:1 and a hydroxyl number of 216 to 316.

The polyester is prepared by reacting a glycol, tris(-hydroxy-ethylisocyanurate), and an aromatic diacid or diester in the presence of a titanate catalyst with about 24 to about 50 equivalent percent diol, about 17 to about 38 equivalent percent triol, and about 33% to about 38% diacid.

Another aspect of the invention is a method of coating an electrical conductor with such enamel by applying the enamel and heating and curing the coated wire.

The foregoing, and other features and advantages of the present invention, will become more apparent from the following description and drawing.

BRIEF DESCRIPTION OF DRAWING

The FIGURE shows viscosity versus temperature of typical enamels according to the present invention.

BEST MODE FOR CARRYING OUT THE INVENTION

The principal reactants in the formation of the magnet wire enamel according to the present invention are the tris(hydroxy-ethylisocyanurate), a diol, and an aromatic diacid or diester. The materials are reacted in the presence of a titanate catalyst.

Representative diols which can be used in the present invention are represented by the formula HO—R—OH where R can be aliphatic, aromatic, cyclic, unsaturated aliphatic, etc. Typical glycols used are:

| | |
|---|---|
| HO—CH$_2$—CH$_2$—OH | ethylene glycol |
| HO—CH$_2$—CH$_2$—CH$_2$—OH | propylene glycol |
| HO—CH$_2$—CH$_2$—CH$_2$—CH$_2$—OH | butyl glycol |

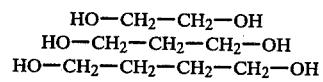

1, 3 butyl glycol

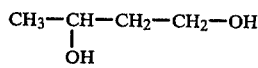

1, 2 butyl glycol

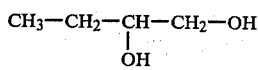

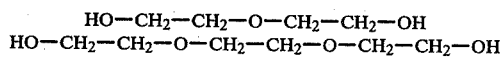

| | |
|---|---|
| HO—CH$_2$—CH$_2$—O—CH$_2$—CH$_2$—OH | diethylene glycol |
| HO—CH$_2$—CH$_2$—O—CH$_2$—CH$_2$—O—CH$_2$—CH$_2$—OH | triethylene glycol |

The preferred diols are the glycols and particularly ethylene glycol with a molecular weight of 62 and an equivalent weight of 31.

The tris(hydroxy-ethylisocyanurate) used has a molecular weight of 261 and an equivalent weight of 87, with the following formula:

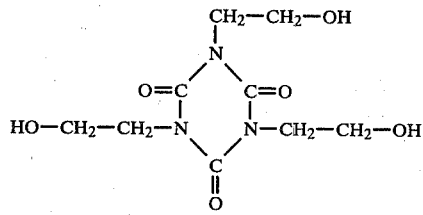

The acid component is a difunctional aromatic acid or aromatic acid ester having the formula:

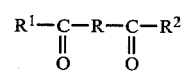

where R is an aromatic group and $R^1$ and $R^2$ are the same or different and selected from the group —OH, —O—$R^3$ (where $R^3$ is aliphatic and typically methyl or ethyl). Typical acid components are:

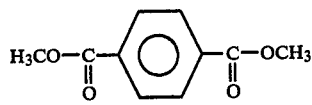
dimethylterephthalate

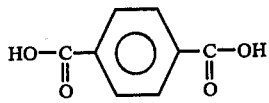
terephthalic acid

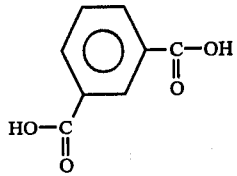
isophthalic acid

The synthesis is carried out in the presence of an esterification catalyst such as tetraisopropyltitanate, tetra(2-ethylhexyl)titanate and litharge (PbO) (with acids only), with titanates and particularly tetrabutyltitanate being particularly preferred, having a molecular weight of 340.4 and having the following formula:

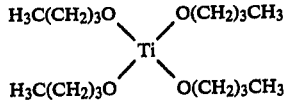

Generally about 24% to about 50% of the diol (preferably about 28% to about 33%), about 17% to about 38% of the triol (about 30% to about 35% preferred) and about 33% to about 46% of the diacid (about 35% to about 38% preferred) (equivalent percent) are reacted in the presence of the titanate catalyst. After reaction, conventional organic solvents (e.g. cresylic acid, phenols, xylenols), conventional modifying phenolics (e.g. condensation products of formaldehyde and phenols or cresols), conventional polyisocyanates (e.g. Mondur®S, Mondur SH, Mobay Chemical Co.) and additional esterification catalyst (such as tetrabutyltitanate) can be added, along with a flow control agent for ease of application. The modifying phenolics are typically added at about 3% to about 6%, and preferably about 4.5%, the polyisocyanates at about 2.5% to about 5.8% and typically about 4.1%, and the additional esterification catalyst at about 3% to about 6% and typically about 4.5%, all percents by weight based on amount of synthesized polyester polymer. Mondur®SH from Mobay with a molecular weight of 804 and an equivalent weight of 268 is particularly preferred. It has the following formula:

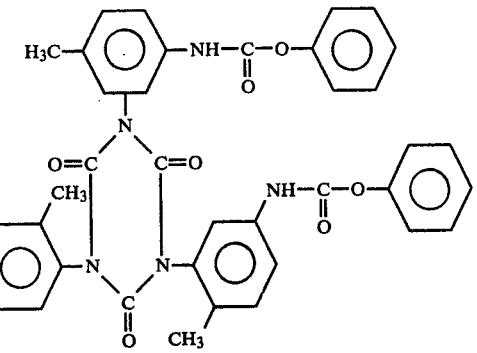

As the modifying phenolic, reaction products of para and meta cresols with formaldehyde are particularly preferred having molecular weights of 138 and the following formulas:

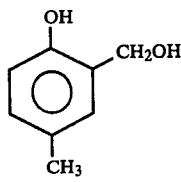 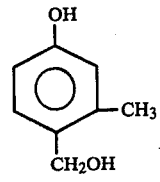
para      meta

Tetronic®R Polyol available from BASF-Wyandotte is the particularly preferred flow control agent. Note copending U.S. patent application Ser. No. 421,753 with a filing date of Sept. 23, 1982, now U.S. Pat. No. 4,447,472, issued May 8, 1984, the disclosure of which is incorporated by reference.

| Part | Material | Example I Equivalents | % By Weight |
|---|---|---|---|
|  | Ethylene glycol (E.G.) | 28.2 | 6.44 |
|  | THEIC | 34.0 | 21.79 |
| 1 | Dimethylterephthalate (DMT) | 37.8 | 26.97 |
|  | Tetrabutyltitanate (TBT) | — | 0.09 |
| 2 | Cresylic Acid | — | 22.03 |
|  | D59 Hydrocarbon | — | 7.20 |
| 3 | 40% Phenolic | — | 5.19 |
|  | 50% Mondur ® SH (SH) | — | 3.84 |
| 4 | Cresylic Acid | — | 4.18 |
|  | TBT | — | 2.09 |
| 5 | D59 Hydrocarbon | — | 0.12 |
|  | Tetronic 130R2 | — | 0.06 |
|  |  |  | 100.00 |
|  | Reaction by Product |  | −8.90 |
|  | Yield |  | 91.10 |

Final Specifications
Solids Content: 1.000 g, ½ hr at 200° C. = 53–55%
Brookfield Viscosity: 31,000 cps at 86° F.
14,750 cps at 100° F.
560 cps at 200° F.
OH/COOH 1.65:1.0

Example I -continued

| Part | Material | Equivalents | % By Weight |
|------|----------|-------------|-------------|
| Equivalent Ratio | | | |

PREPARATION

Part one is heated and mixed under an inert atmosphere to 220° C. over an eight-hour period. It is held at 220° C. for four hours until all of the methanol reaction by-product has been removed. The polymerization stops at a molecular weight distribution that gives a Gardner-Holdt viscosity at 30° C. of G to H when 5.0 grams of resin are dissolved in 15.0 grams of cresylic acid.

The resin of part one is cooled to 180° C. and cut with the solvent of part 2. The mixture is further cooled with mixing to 100° C. where part 3 is added. The mixture is held at 100° C. for one hour. Part 4 is mixed together and heated to 110° C. for one-half hour. The parts 1–3 mixture is cooled to 95° C. and part 4 is added with mixing. The part 1–4 mixture is cooled to 70° C. and part 5 is added with mixing. The finished enamel is cooled and filtered.

Example II

| Part | Material | Equivalents | % By Weight |
|------|----------|-------------|-------------|
|   | E.G. | 32.2 | 8.12 |
|   | THEIC | 32.1 | 22.71 |
| 1 | DMT | 35.7 | 28.12 |
|   | TBT | — | 0.10 |
| 2 | Cresylic Acid | — | 24.55 |
| 3 | 40% Phenolic | — | 5.56 |
|   | 50% SH | — | 4.11 |
| 4 | Cresylic Acid | — | 4.45 |
|   | TBT | — | 2.22 |
| 5 | Tetronic 130R2 | — | 0.06 |
|   |   |   | 100.00 |
|   | Reaction by Product |   | −9.28 |
|   | Yield |   | 90.72 |
| Final Specifications | | | |
| Solids Content: | 1.000 g,½ hr at 200° C. = 54.5–57.5% | | |
| Brookfield Viscosity: | 22,450 at 86° F. | | |
|   | 8,800 at 100° F. | | |
|   | 365 at 180° F. | | |
| OH/COOH | 1.8:1 | | |

PREPARATION

The same as Example I except that the finished polymer molecular weight distribution results in a Gardner-Holdt viscosity of G ¼ to H ½ when 6.0 grams of resin are dissolved in 14.0 grams of cresylic acid.

Example III

| Part | Material | Equivalents | % By Weight |
|------|----------|-------------|-------------|
|   | E.G. | 32.2 | 8.72 |
|   | THEIC | 32.1 | 24.39 |
| 1 | DMT | 35.7 | 30.20 |
|   | TBT | — | 0.10 |
| 2 | Cresylic acid | — | 18.98 |
| 3 | 40% Phenolic | — | 5.98 |
|   | 50% SH | — | 4.41 |
| 4 | Cresylic acid | — | 4.78 |
|   | TBT | — | 2.38 |
| 5 | Tetronic 130R2 | — | 0.06 |
|   |   |   | 100.00 |
|   | Reaction by Product |   | −9.96 |
|   | Yield |   | 90.04 |

Example III -continued

| Part | Material | Equivalents | % By Weight |
|------|----------|-------------|-------------|
| Final Specifications | | | |
| Solids Content: | 1.000 g,½ hr at 200° C. = 59–61% | | |
| Brookfield Viscosity: | 95,000 cps at 86° F. | | |
|   | 32,000 cps at 100° F. | | |
|   | 575 cps at 180° F. | | |
| OH/COOH | 1.8:1 | | |

PREPARATION

The same as Example II.

Example IV

| Part | Material | Equivalents | % By Weight |
|------|----------|-------------|-------------|
| 1 | E.G. | 32.2 | 9.68 |
|   | THEIC | 32.2 | 27.12 |
|   | DMT | 35.6 | 33.58 |
|   | TBT | — | 0.11 |
| 2 | Cresylic acid | — | 12.23 |
| 3 | 40% Phenolic | — | 6.65 |
|   | 100% SH | — | 2.44 |
| 4 | Cresylic acid | — | 5.32 |
|   | TBT | — | 2.66 |
| 5 | Tetronic 130R2 | — | 0.07 |
|   | Hydrocarbon D59 | — | 0.14 |
|   |   |   | 100.00 |
|   | Reaction by Product |   | −11.08 |
|   | Yield |   | 88.92 |
| Final Specifications | | | |
| Solids Content: | 1.000 g,½ hr at 200° C. = 68–70% | | |
| Brookfield Viscosity: | 600,000 cps at 100° F. | | |
|   | 1,200 cps at 200° F. | | |
| OH/COOH | 1.8:1 | | |

PREPARATION

The same as Example II.

The enamels of Examples I, II, and III were applied to 18 AWG copper in multiple passes as the basecoat with a standard polyamideimide as a topcoat. The basecoat to topcoat ratios of the total enamel build on wire were 75–80:25–20. The enamels were cured by passing the wire through a standard 20 foot gas fired oven with bottom and top zone temperatures of 620° F. and 840° F. respectively. A comparison of properties is shown in the Table.

TABLE
Magnet Wire Properties of THEIC Polyesters with Polyamide Imide Topcoat

| Theic Polyester | Conventional | Ex. I | Ex. II | Ex. III |
|---|---|---|---|---|
| % Solids Content | 29 | 54 | 57 | 60 |
| Wire Size (AWG) | 18 | 18 | 18 | 13 |
| Smoothness | Good | Good | Good | Good |
| Build (MILS) | 3.1 | 3.1 | 3.2 | 3.3 |
| Flexibility (SNAP + 3X) | Pass | Pass | Pass | Pass |
| Heat Shock 20% + 3X 220° C. | Pass | Pass | Pass | Pass |

While the polymers according to the present invention can be used on any electrical conductor, they are preferably used on wires and specifically magnet wires. The wires are generally copper or aluminum. Wires ranging anywhere from 4 AWG to 42 AWG (American Wire Gauge) are coated, with 18 AWG being the most commonly coated wire. Wire coatings can be anywhere from 0.2–5 mils or any thickness desired, and preferably about 3.2 mils on 18 AWG wire when applied in 6 coatings of equal thickness with curing between coats. The coatings can be used as a sole insulation coat or part of a multicoat system in combination with other conventional polymer insulation, such as other polyesters, polyamides, polyamideimides, polyesterimides, etc., and combinations thereof. The polymer coatings of the present invention can also contain lubricants either externally on the coating, internally in the coating, or both.

The enamels made according to the present invention can be applied by any standard means such as coating dies, roller or felt application with viscosity adjustments made accordingly. Viscosity adjustments can be made by adjusting the temperature of the enamel (see the Figure) or by dilution with appropriate enamel solvents, or diluents for any coating method, the enamel of the present invention still providing higher solids content at a given viscosity even accounting for adjustment, regardless of application method (i.e., the viscosity is "low" relative to the solids content). As the enamel solvents, any conventional enamel solvents such as cresylic acid, phenols or xylenols can be used.

Conventional curing ovens can be used to heat treat the coated magnet wire. Inlet oven temperatures of the order of about 500°–700° F. (260° C.–371° C.), preferably about 580° F. (304° C.) and outlet oven temperature of about 800°–1100° F. (427°–593° C.), and preferably about 900° F. (482° C.) are typically used for drying and curing.

While this invention has been described in terms of magnet wire insulation, this invention includes the use of this material as a free standing film, e.g. for such uses as phase insulation, coil wrapping, etc., and as varnishes for uses other than magnet wire insulation.

As discussed above, in addition to the cost saving advantages of employing enamels according to the present invention, this unique stoichiometry also provides for a better product by virtue of better control of the reaction during synthesis (less tendency to gel). As compared to conventionally prepared THEIC polyester enamels the controlled molecular weight distribution resulting from the 1.65 to 2.0:1 hydroxyl to carboxyl stoichiometry provides improved polymer solubility and results in smoother solvent (and diluent) removal during drying and curing of the enamel since there is less tendency for trapping of solvent resulting in smoother coatings with less tendency to blister or form beads. Furthermore, using less solvent per application because of higher solids at lower viscosity results in less solvent being removed in the bake cycle and therefore less polluting effects.

The finished enamel can contain 50% to about 70% solids content and still be in a viscosity range that is easily handled during enamel production and final application. Note the Figure which shows typical viscosities at various temperatures where A is at 55.4% solids, B is at 60.4% solids and C is at 66.8% solids. The resulting enamel cures on wire to give all of the desirable magnet wire properties of a low solids content THEIC polyester and requires 35 to 55% less energy for the application cure in a typical low solids content enamel.

Although this invention has been shown and described with respect to detailed embodiments thereof, it will be understood by those skilled in the art that various changes in form and detail thereof may be made without departing from the spirit and scope of the claimed invention.

We claim:

1. A magnet wire enamel comprising a high solids, low viscosity organic solvent solution of a tris(hydroxyethylisocyanurate)polyester having a ratio of hydroxyl to carboxyl groups of 1.65 to 2.0:1 and a hydroxyl number of 216 to 316.

2. The enamel of claim 1 wherein the ratio of hydroxyl to carboxyl groups is about 1.8 to 1 and the hydroxyl number is about 250 to 270.

3. The enamel of claim 1 wherein the solids content is about 50% to about 70% by weight.

4. The enamel of claim 1 wherein the viscosity is less than 1,500 cps at 200° F.

5. The enamel of claim 1 additionally containing about 3% to about 6% modifying phenolic, about 2.5% to about 5.8% polyisocyanate, and about 3% to about 6% esterification catalyst, all percents being weight percent based on amount of polyester.

6. The magnet wire enamel of claim 1 which additionally contains up to 0.1% by weight of a polyol flow control agent.

7. A method of coating an electrical conductor comprising applying thereto a high solids, low viscosity organic solvent solution of a tris(hydroxyethylisocyanurate)polyester enamel having a ratio of hydroxyl to carboxyl groups of 1.65 to 2.0:1 and a hydroxyl number of 216 to 316, drying and curing the enamel on the coated wire.

8. The method of claim 7 wherein the polyester has a ratio of hydroxyl to carboxyl groups of about 1.8 to 1 and a hydroxyl number of about 250 to about 270.

9. The method of claim 7 wherein the solids content of the enamel is about 50% to about 70% by weight.

10. The method of claim 7 wherein the enamel has a viscosity less than 1,500 cps at 200° F.

11. The method of claim 7 wherein the enamel contains about 3% to about 6% modifying phenolic, about 2.5% to about 5.8% polyisocyanate, and about 3% to about 6% esterification catalyst, all percents being weight percent based on amount of polyester.

12. A method of making a high solids, low viscosity magnet wire polymer comprising reacting in equivalent percent about 17% to about 38% tris(hydroxyethyl)isocyanurate, about 24% to about 50% of a diol and about 33% to about 46% aromatic diacid or aromatic diester in the presence of a titanate catalyst to form a polyester having a ratio of hydroxyl to carboxyl groups of 1.65 to 2.0:1 and a hydroxyl number of 216 to 316.

13. A method of making a high solids content, low viscosity magnet wire enamel comprising reacting in equivalent percent about 17% to about 38% tris(hydroxyethyl)isocyanaurate, about 24% to about 50% of a diol and about 33% to about 46% aromatic diacid or aromatic diester in the presence of a titanate catalyst to form a polyester having a ratio of hydroxyl to carboxyl groups of 1.65 to 2.0:1 and a hydroxyl number of 216 to 316, and adding sufficient organic solvent to produce a solids content of about 50% to about 70% by weight.

14. The method of claim 12 or 13 wherein the diol is ethylene glycol, and the aromatic diester is dimethylterephthalate.

15. The method of claim 13 including adding to the polyester about 3% to about 6% modifying phenolic, about 2.5% to about 5.8% polyisocyanate, and about 3% to about 6% esterification catalyst after the polyester formation, all percents being weight percent based on amount of polyester.

* * * * *